United States Patent [19]
Reutimann et al.

[11] Patent Number: 5,567,453
[45] Date of Patent: *Oct. 22, 1996

[54] PROCESS OF COATING FOODS WITH A SYSTEM FOR FLUID RETENTION AND PRODUCT THEREOF

[75] Inventors: Ernesto J. Reutimann, New Milford; Dharam V. Vadehra, New Milford; Elaine R. Wedral, Sherman, all of Conn.

[73] Assignee: Nestec S.A., Vevey, Switzerland

[ * ] Notice: The term of this patent shall not extend beyond the expiration date of Pat. No. 5,403,600.

[21] Appl. No.: 410,772

[22] Filed: Mar. 27, 1995

Related U.S. Application Data

[63] Continuation of Ser. No. 906,753, Jun. 30, 1992, Pat. No. 5,403,600.

[51] Int. Cl.⁶ .............................. A23B 4/10; A23L 1/31
[52] U.S. Cl. ......................... 426/89; 426/92; 426/93; 426/302; 426/305; 426/310; 426/656
[58] Field of Search .................. 426/89, 92, 297, 426/302, 303, 305, 310, 324, 325, 574, 657, 52, 412, 523, 113, 129

[56] References Cited

U.S. PATENT DOCUMENTS

| | | |
|---|---|---|
| 3,323,922 | 7/1967 | Durst . |
| 3,406,081 | 5/1968 | Bauer et al. . |
| 3,506,455 | 1/1970 | Savage et al. . |
| 3,843,827 | 10/1974 | Lee .......................................... 426/302 |
| 3,956,515 | 5/1976 | Moove et al. ........................... 426/302 |
| 4,071,635 | 3/1978 | Lindl . |
| 4,570,339 | 2/1986 | Taylor ....................................... 222/80 |
| 4,913,919 | 4/1990 | Cornwell et al. ....................... 426/302 |
| 4,935,251 | 1/1990 | Verhoef . |
| 5,248,512 | 7/1993 | Berberat et al. . |

FOREIGN PATENT DOCUMENTS

| | | |
|---|---|---|
| 0393361 | 10/1990 | European Pat. Off. . |
| 55-156580 | 12/1980 | Japan ....................................... 426/310 |
| 58-205473 | 11/1983 | Japan ....................................... 426/305 |
| 8001969 | 11/1981 | Netherlands ............................. 426/302 |
| 2097646 | 11/1982 | United Kingdom . |
| 2242815 | 10/1991 | United Kingdom .................... 426/302 |
| WO8600501 | 1/1986 | WIPO . |

OTHER PUBLICATIONS

Rombauer et al. Joy of Cooking, 1975, The Bobbs–Merrill Co., Inc. New York, pp.341–348.

*Primary Examiner*—Anthony J. Weier
*Attorney, Agent, or Firm*—Vogt & O'Donnell, LLP

[57] ABSTRACT

Foods are coated with a mixture of egg albumen, a milk protein, an ungelatinized starch and water to provide a system for retaining fluids in the foods, particularly those foods which are heated to cook them. To effect fluid retention in the foods, at least the coating is heated to a temperature sufficient for a time sufficient to coagulate the egg albumen, denature the protein and gelatinize the starch of the coating, at least partially, and the coated foods may be heated to cook them at least partially, thereby coagulating the egg albumen, denaturing the milk protein and gelatinizing the starch of the coating. In an embodiment, the coated meat is heated to at least coagulate the albumen, denature the milk protein and gelatinize the starch to obtain a heat-treated coated food product and then, the heat-treated coated food product is vacuum-packed and heated at a temperature and for a time sufficient so that the food product is microbiologically stable.

16 Claims, No Drawings

PROCESS OF COATING FOODS WITH A SYSTEM FOR FLUID RETENTION AND PRODUCT THEREOF

CROSS REFERENCE TO RELATED APPLICATION

This application is a continuation application of application Ser. No. 07/906,753, filed Jun. 30, 1992, now U.S. Pat. No. 5,403,600.

BACKGROUND OF THE INTENTION

The present invention relates to treating food to enhance fluid retention within the food during preparation of the food for immediate or subsequent consumption and during storage.

A variety of compositions and means have been employed and proposed to protect foods from effects of atmospheric oxygen and moisture, to inhibit moisture migration between components of composite foods having differing moisture contents and to "extend" and/or to improve texture and/or to improve fluid retention in foods.

Food coating compositions long have been prepared from various combinations of materials as illustratively discussed in PCT Patent Application, International Publication No. WO 86/00501, which discloses preparation of a distinct and discrete dehydrated film ply which, after preparation, is placed between components of a multi-component food product to inhibit moisture transfer between components. The film is prepared from a combination of a lipid, a cellulose-ether-carbohydrate polymer and water, although it is said that a combination of a lipid and of a starch or a protein polymer, such as albumen, could be employed. The film may be embodied by separate lipid and polymer layers, or the ingredients may be combined to form a water and oil emulsion to enable production of the film in a single ply.

Verhoef, et al., U.S. Pat. No. 4,935,251, disclose coating an at least partially baked pastry product, particularly croutons, with an oil and water emulsion which contains a film-forming material preferably rich in protein. The composition may be prepared with or without flour, and is intended to reduce moisture absorption.

Although alluding to possible applicability to various foods, Durst, U.S. Pat. No. 3,323,922, discloses coating baked goods with a combination of a film-forming substance, a plasticizer and a liquid immiscible in the plasticizer to protect the food from oxygen and effects of humidity. It is disclosed that the film-forming substances may include a variety of materials such as protein materials, including albumen, and such as gelatinized starch. The plasticizer may be water or a glycol, for example. The immiscibte liquid may include oils and various organic compositions. Fillers, including non-hydrolyzed starch, may be included in the coating composition.

Bauer, et al., U.S. Pat. 3,406,081, disclose applying edible water-in-oil emulsions comprised of a fat, emulsifiers and water to coat a frozen meat to provide a continuous substantially water vapor-impervious coating.

Substantially fat-free food coatings also have been sought to address a lack of oil coating effectiveness of edible oil and oil-containing coatings when the coated products are heated. To address that and other problems, European Patent Application Publication No. 0 393 361 discloses coating a food with a composition which was found to be particularly useful for preventing moisture migration in a multi-component food product between food materials having differing moisture contents. As disclosed, egg, milk protein and water are mixed, coated upon a food and then heated to a temperature of from 70° C. to 100° C., which is disclosed to be critical, to coagulate the egg. The food upon which the composition is coated is usefully a less moist component of the composite food product.

As also disclosed by the European Application, the composition advantageously may include gelatinized starch to improve bonding and adhesion of the egg and milk protein to the food. As disclosed, the contents of the components should not fall appreciably below or exceed limits of from 3% to 12% egg, from 3% to 18% milk protein and from 7% to 12% gelatinized starch, by weight. It is taught that if the amounts fall below these limits, the coating would be less impermeable with a less resistant texture, and that if the amounts exceed the upper limits, the coating would be too thick and too hard, and would be noticed by the consumer.

As is appreciated in the art, fluid retention and texture deterioration are problematical during preparation of so-called convenience foods which are refrigerated, and usually frozen. Fluid retention and texture deterioration are particularly problematical in the case when a food is cooked prior to being refrigerated or frozen for storage, so that the consumer need only heat the food to a temperature desirable for consumption. Because of fluid loss, a dry, fibrous, tough texture is imparted to the foods, which makes them less desirable than fresh foods to a discerning consumer.

Cooking losses incurred by meats, for example, may range up to from about 20% to about 30% by weight based upon the weight of the product prior to cooking, by reason of fluid loss during cooking. Additionally, freezing procedures, particularly procedures such as blast freezing, as is known in the art, may contribute to further fluid loss and texture deterioration. Moreover, further fluid losses may occur during storage and generally will occur upon reheating for consumption.

As also will be appreciated, further problematical are food products wherein a food, such as a meat, or vegetables, is cooked and combined with a sauce and then stored. Although the art has focused upon inhibiting moisture transfer from a more moist food component to a less moist food component of a composite food to prevent the less moist component from becoming soggy, such as in the case of a pizza, for example, the problem with combining particularly a meat with a sauce has been found to be different. Because meat, even though it could be considered a less moist component when contained in a sauce, itself contains a substantial amount of fluids, the fluids transfer out of the meat into the sauce and thereby dilute the sauce and impair the viscosity and character of the sauce, and the meat, even though contained in a fluid-containing sauce, acquires a dry, fibrous, tough character. In addition, the problem becomes even more acute when a product of this nature is retorted, as is common in the art.

Additionally, of particular recent interest in convenience food preparation is a method known as sous vide, which is employed for providing microbiologically stable vacuum packed foods, including meats, and particularly fish, which require only heating to a desirable temperature for consumption. In this process, a raw meat is placed in a pouch, preferably transparent, which then is vacuum sealed. The pouch containing the meat is heated, generally by placing it in a water bath which has a temperature of from about 60° C. to about 75° C. until the meat reaches an internal core temperature ("ICT") which is considered sufficient to at least make the meat microbiologically stable for storage, i.e., generally 60° C. and above. Then, the meat is held at the stated temperature for about 15 mins to about 20 mins. The pouch and contents then are chilled to a refrigeration temperature, i.e., generally about 4° C. to about 8° C., and/or frozen.

However, when preparing products such as meat in the sous vide manner, although the objective of the process is to provide a convenience product having the appearance and characteristics of a fresh product when purchased and prepared for consumption, that objective has not been able to be realized effectively. Problems are particularly acute for fish because it loses fluids readily and becomes not only dry, fibrous and tough upon consumption, but also the product is not aesthetically pleasing in the package because of fluids which exude from the products.

One means employed to attempt to obtain a final sous vide product containing sufficient fluids and moistness has been to marinate the raw meat prior to vacuum packing it. However, on one hand, the marination tends to impart a texture to the meat which is not characteristic of conventionally cooked fresh meat, and on another hand, because the marination fluids tend to separate from the solids, the solids tend to form into a granular type consistency during the ICT cooking and during preparation for consumption.

Additionally, in the sous vide process, and for that matter in preparation of other meat or meat-containing convenience foods, it often is preferred to sear or grill the meat first to impart color to the meat to effect a desirable aesthetic effect. That, however, generally also results in a fluid loss which may range, depending upon the meat, up to about 10% by weight which, as is evident from the above discussion, contributes to a final product having a dry, fibrous, and tough texture.

Moreover, in the sous vide process or with a boil-in-bag type products, as are known also in the art, and which contain meat, for example, moisture generally separates from the meat during any preparative heating process and during storage in a further amount of from about 5% to about 15% by weight. As noted above, that presents an unappealing appearance in the package, even if an absorbent material, which is sought to be avoided, is included in the package to soak up fluids.

In addressing certain problems arguably analogous to those noted above, to prepare a "luncheon" meat product, Lindl, et al., U.S. Pat. No. 4,071,635, disclose incorporating and blending a dry composition of starch and protein components within a mass of comminuted meat to "extend" the meat. In the Lindl system, which is disclosed as also affording reduction of cooking loss, the starch component is disclosed as acting not only as a filler-extender, but also as a fat and water binder which acts within the product mass to inhibit escape of fluids from the mass. The protein is disclosed as fulfilling a texture function to improve chewability characteristics, which are said to be affected adversely by the starch.

As taught by Lindl, et al., the starch of the dry composition preferably gelatinized corn starch, and may be employed in an amount of from 25% to 85% by dry weight based upon the weight of the dry composition. The protein, of which at least a part is egg albumen, may be employed in an amount of from 1.5% to 55% by dry weight, based upon the weight of the dry composition. The dry composition is added to the comminuted meat to be treated, and although some water may be added to the meat prior to addition of the dry composition, the majority of water is added to the meat upon addition of the dry composition. Water is employed in an amount, by weight, of from 1.5 to 4 times the weight of the dry composition, which may provide a meat to dry mix/water ratio of from 1:0.25 to 1:2.5. After mixing, the meat mixture is molded and then cooked.

To reduce cooking loss of uncomminuted whole pieces of meat, starches, including gelatinized starches, and proteins also have been disclosed as being employed as components of marination media which are sought to be impregnated within the meat mass to effect retention of fluids within the mass. Commonly, marinades are a dilute suspension of such components and may be added to whole pieces of uncomminuted meat generally by injection, as illustrated, for example, by Savage, et al., United States Pat. No. 3,506,455, although soaking and tumbling marination procedures to impregnate the meat also are known. As disclosed by Savage, starches and proteins are sought to be incorporated within the interior of the meat pieces in an amount of from 1% to 15% by weight of the impregnated meat. The impregnation media may include an medium, wherein it is taught that encapsulation of the starch and protein ingredients is desired to enable them to retain their water-binding capacity. A fat or oil medium also may be employed.

It also has long been practice in the convenience food preparation art to attempt to improve the appearance of foods by applying a batter, particularly flour-based batters, to the foods to enable a coating of bread crumbs or other farinaceous material to be applied on the foods for the purpose of achieving a browned appearance. Generally, the coated foods are deep-fat fried, although such may be baked. Such processes, however, have little effect upon fluid loss and, in fact, a significant problem in the art is that upon cooking for consumption, the crumb coatings become undesirably soggy. Thus, such systems do not provide guidance for one seeking to obtain a product having a fresh shelf appearance or an appearance, upon heating for consumption, which is similar to the appearance of a cooked fresh product.

An approach which is said to promote moisture retention in foods, such as cooked or raw meat or vegetables, is disclosed in UK Patent Application 2 097 646, wherein a food is coated with a substantially fat-free, flour-based batter which contains an egg white substitute which is contained in the batter in an amount of from 0.5% to 10% by weight on a dry weight basis. The egg white substitutes are disclosed as being preferably a globular proteinaceous material which is soluble in water and coagulable with heat, although such may include egg albumen "extended" with a proteinaceous or non-proteinaceous material.

Said to be a particularly preferred component of the coating composition, as set forth in the UK disclosure, is a substitute identified as MERI-WHITE, which variously is disclosed as containing an egg albumen content of up to about 28%, and starch, which includes gelatinized starch, in an amount greater than the amount of the albumen. It is disclosed that the substitutes alternatively may be based upon whey, which is said to contain about 30% lactalbumen, or upon whey protein isolates, which are said to have a protein content of between 20% and 30%.

As disclosed in the UK Application, the "typical" process employs, just as in prior art breading processes, deep-fat frying the coated food. Hence, the flour-based coating will take up cooking fat or oil which may act, in effect, as a further coating material, the coating will have a distinct, apparent browned coating, and excess frying oil must be removed from the product.

SUMMARY OF THE INVENTIONS

The present inventions include a process for treating a food characterized in that a mixture of egg albumen, milk protein, an ungelatinized starch and water ingredients are prepared, and then, the mixture is coated on an exterior surface of a food product mass to be heated for immediate or subsequent consumption. To achieve the objects and advantages of the present inventions, the ingredients must be present in the mixture in amounts, by weight, of at least about 5% egg albumen, at least about 5% milk protein, at least about 25% unmodified starch and at least about 40% water, each weight being based upon the weight of the mixture.

Although, as discussed further below, the mixture may include a gelatinized starch, when a gelatinized starch is included in the mixture, the amount of the gelatinized starch must not exceed about 6% by weight based upon the weight of the mixture. Preferably, if employed at all, gelatinized starch is employed in amounts only on the order of up to about 3%, and preferably only up to about 2%, by weight based upon the weight of the mixture.

Preferably, however, no gelatinized starch is employed, and in that case, the ungelatinized starch is employed in an amount of at least about 30% by weight based upon the weight of the mixture.

In addition, as a preferred embodiment, it has been discovered that addition of an edible oil provides an emulsifying effect and tends to provide improved homogeneity to the ingredients of the mixture. It also has been found that an oil advantageously provides a more flexible, or elastic, coating which enhances the effectiveness of the coating by inhibiting a potential of coating cracking which may result in localized leakage.

Salt (NaCl) also advantageously may be added to the mixture, particularly if the mixture is to be left standing over extended periods of time, since it is believed to have a beneficial effect upon stability of the mixture.

In addition, seasonings, exclusive of salt, and flavor ingredients, or flavor precursors, for example, and other materials in amounts which do not affect the basic physical characteristics and properties of the coating mixture, particularly its fluidity and adhesiveness, such as will be found with gelatinized starch and flours, also may be employed in the mixture. Hence, flours, also, although such might be employed in the mixture in small amounts, preferably are excluded.

The present inventions also include the resultant product mixtures described above, with or without water, and include food compositions wherein a food contains a coating of the mixture compositions described above.

To effect the benefits of the present inventions, such are characterized further in that the coating of the coated food product is heated to at least a temperature and for a time sufficient to, at least partially, coagulate the egg albumen, denature the milk protein and gelatinize the ungelatinized starch to obtain a heat-treated coated food product. Alternatively, the coated food product is heated to a temperature and for a time sufficient to cook the food at least partially, thereby also coagulating the egg, denaturing the milk protein and gelatinizing the starch to provide an at least partially cooked food product.

Also included in the present inventions are heat-treated food products coated with the mixture compositions described above, wherein the egg, milk protein and starch are, respectively, at least partially coagulated, denatured and gelatinized, and also included are at least partially cooked coated food products wherein the albumen, protein and starch are coagulated, denatured and gelatinized, respectively. Particularly preferred products are whole coated meat pieces, including cooked coated meat pieces contained in an edible sauce.

A further embodiment of the present inventions, which is particularly useful for treating raw fish, includes the process of preparing mixture compositions described above, coating the same on a food, vacuum packaging the coated food and then heating the packaged coated food to a sufficient internal core temperature (ICT) for a time sufficient to render it microbiologically stable. Preferably, and particularly if a sauce is packed with the coated food, at least the coating is heated, prior to vacuum packing, to a temperature sufficient and for a time sufficient to, at least partially, coagulate the egg, denature the protein and gelatinize the starch. Such products may be refrigerated and/or frozen prior to consumption. To enhance the aesthetic appearance of the product, the coated food advantageously is subjected to grilling, to place grill marks thereon, or to an analogous searing heat to color the food, which thereby operates to, at least partially, coagulate the egg, denature the protein and gelatinize the starch and generally, to at least partially cook the food.

A further embodiment includes the process and product of packaging the coated products, as described above, cooked or uncooked, with or without an edible sauce, in boil-in-bag packaging as is known in the art.

Further particularly advantageous embodiments include the process and product of combining the coated food products with a sauce and retorting the combined product with retorting procedures as are known in the art, preferably after having at least heated the coating to, at least partially, coagulate the egg albumen, denature the protein and gelatinize the starch.

Particularly when the coated food is to be combined with a sauce, most desirably, the coated food is heated sufficiently so that substantially all of the egg albumen, milk protein and starch are, respectively, coagulated, denatured, and gelatinized.

As will be found from employing the mixtures of the present inventions, and by proceeding in accordance with the processes of the present inventions, cooked products, particularly in the area of convenience foods, are obtained which have a significantly higher cooked weight and organoleptic and aesthetic appeal than if the products were not treated with the coating mixtures of the inventions. The inventions also avoid the necessity of treating an interior mass of foods, and thus enable one to avoid marination, tumbling and injection procedures of the art to obtain fluid retention. Additionally, in contrast to the batter and breading coatings of the art, including the aforenoted UK Application, a product wherein the coating material is not readily perceptible to the untrained eye is obtained, because the coating enables obtaining a substantially unobtrusive film.

DETAILED DESCRIPTION OF THE INVENTIONS

The coating of the inventions is particularly applicable for application to raw foods, which are herein meant to include fresh and frozen raw foods. Meat, which is meant herein to include all kinds of meats, including red meat, poultry and fish meats, is treated most advantageously. The treated foods may be employed for preparation of cooked and refrigerated, and/or frozen, products which merely require heating for consumption, for example. The foods may be cooked by such as by frying, including stir-frying, grilling and/or baking, and the afore-noted sous vide and boil-in-bag and retorting processes. Of course, however, cooked or partially cooked and/or seared or blanched meats and vegetables may be treated. Pastas and breads also may be treated advantageously.

In the present inventions, "whole" foods are treated as opposed to ground or comminuted foods. "Whole" foods are intended to include discrete pieces of foods, large and small, which have not been subjected to a comminution or grinding procedure which thereby requires a mixing procedure, rather than a coating procedure, to incorporate additives and which thereafter requires molding or otherwise forming the food to obtain discrete reformed pieces. Whole foods, however, also are intended to include ground or comminuted foods which have been molded or otherwise reformed into a mass, and in this context, in accordance with a process of the inventions, the outer, or exterior, of the formed mass is coated.

In the practice of the present inventions, the egg albumen must be present in the mixture in an amount sufficient so that a substantially continuous film of the albumen can be and is coated on the food and so that upon heating of the coated food, thereby resulting in coagulation of the albumen, the coagulated albumen inhibits escape of water from the food. To effect this result, the amount of egg albumen employed should comprise at least about 5%, and preferably at least about 6%, by weight based upon the weight of the mixture to be applied to the food as the coating, and when coated on the food, the egg albumen will comprise at least about 0.25%, and preferably at least about 0.3%, by weight based upon the weight of the food to be coated.

Generally, for best results, egg albumen may be employed in the mixture in an amount of from about 6% to about 11% by weight based upon the weight of the mixture, and preferably from about 6% to about 10% by weight. Also for best results, although such is to some extent food product dependent, it has been discovered that it is not desirable to employ egg albumen in an amount more than about 12%, and preferably not more than about 11%, by weight, since it has been found that, depending upon the particular application, such may affect texture, mouthfeel and flavor of the product adversely by imparting a tough "bite" characteristic and by imparting sulfur notes and/or slight bitterness to the product.

The milk protein is employed also in an amount sufficient to coat the food uniformly with the protein so that upon heating of the coated food and denaturation of the protein, the protein swells and, together with the coagulated albumen, seals the surface of the food to inhibit escape of fluids from the food by forming a substantially continuous film. The amount of milk protein employed should comprise at least about 5%, and preferably at least about 6%, by weight based upon the weight of the mixture to be applied to the food as the coating, and when coated on the food, the milk protein will comprise at least about 0.25%, and preferably at least about 0.3%, by weight based upon the weight of the food to be coated.

Generally, for best results, the milk protein is employed in the mixture in an amount of from about 10% to about 19% by weight based upon the weight of the mixture and preferably from about 15% to 18% by weight.

In general, for best results, when amounts of egg albumen on the order of from about 5% to 6% by weight of the mixture are employed, it is desirable to employ greater amounts of milk protein, preferably, amounts on the order of up to about 20% by weight. Amounts of egg albumen and milk protein less than a total of about 10% by weight (mixture weight) and 0.5% by weight (based on food weight) will not provide desirable fluid retention, and amounts greater than a total of about 25% by weight (mixture weight) and 1.5% by weight (food weight) tend to result in a less than desirable perception of texture.

Again, in general, the total amount of egg albumen and milk protein is preferably in an amount of from about 15% to about 20% by weight based on the weight of the mixture. Thus, when employing egg albumen, for example, in an amount of about 6% by weight, milk protein is employed in an amount of at least about 9% by weight, each weight being based upon the weight of the mixture.

The milk protein employed in the present invention is undenatured so that it may be heat-set, i.e., denatured by heat, after it is coated on the food. Although a variety of proteins known in the art may be employed, as will be appreciated, the protein, as well as any other ingredient, should be one which is food-acceptable, a primary consideration, however, being the impact of the flavor the milk protein imparts to the final coated product. For example, caseinate is less preferred because it generally is found to impart a bitter taste to the final product.

Particularly useful milk proteins include those obtained from skim milk, whey and milk protein concentrates and isolates and other products including but not limited to low lactose whey powder. A whey protein concentrate known as LACPRODANE 80 protein concentrate has been found to provide particularly desirable results.

It is essential that an ungelatinized, starch be employed to enable applying, particularly in the cases of raw foods, including particularly meat, an effective coating to the food. Although it is sought that the egg albumen and milk protein components provide the primary fluid retention function of the coating, as will be appreciated upon practice of the present inventions, after the ungelatinized starch has been coated on the meat and heated, it then has the ability to operate to take up moisture which may escape from the food. It also has been discovered, however, that the starch contributes elasticity to the albumen and milk protein elements which acts to relieve stress upon those elements, which thereby inhibits the potential of coating cracking and thus further enhances the effectiveness of the coating by reducing the potential for localized leakage. By providing elasticity, the starch thereby also reduces the necessity of the starch having to act as a moisture absorber.

The mixture must contain ungelatinized starch in an amount of at least about 25% by weight based upon the weight of the mixture, and when coated on a food, the ungelatinized starch will be in an amount of at least about 1.5% by weight based upon the weight of the food to be coated.

On the other hand, as noted above, it also has been discovered that gelatinized, pregelatinized, starch, while not being able to fulfill the functions of the ungelatinized starch, may be employed advantageously in the mixture as an additive to act as a suspension stabilizer which may assist, particularly when particulate condiments, such as seasonings, are included in the mixture. However, gelatinized starch has a substantial effect upon the fluidity, i.e., the viscosity, of the mixture. That is, it alters the basic character and affects the ability to apply an effective coating to the foods, and to combat that, water in amounts greater than desired may have to be employed which, as discussed below, is not desirable for coating effectiveness.

Hence, gelatinized starch in amounts greater than about 6% by weight based upon the weight of the mixture are not employed. To obtain desirable results of suspension stabilization of added condiments, i.e., spices, for example, amounts only on the order of from about 2% to about 3% by weight, based upon the weight of the mixture, and preferably less, are employed, and as indicated above, it is preferred to avoid employment of gelatinized starch. Moreover, because of the lack of perception of the coating of the invention to the untrained eye and a desire to allow the consumer to season to taste, even addition of seasoning condiments, which frequently are added to mask effects of treatments to convenience foods, is sought to be avoided.

Therefore, in what are considered most desirable embodiments, no gelatinized starch is employed, and it then essential that the gelatinized starch be employed in an amount of at least about 30% by weight based upon the weight of the mixture. Preferably, the ungelatinized starch is employed in an amount of from about 35% to about 55% by weight based upon the weight of the mixture. As with the milk protein component, a variety of starches, which are obtained from grains and tubers, may be employed. Such starches include corn, wheat, oat, potato, tapioca and rice starches.

Water is employed in the mixture preferably in an amount sufficient to enable obtaining a flowable fluid mass. If too much water is added, the mixture is too thin and fluid, and the coating ingredient substances are too diluted to coat and/or inhibit escape of fluids from the food effectively, particularly during cooking. For example, if too much water is employed, upon storage, including refrigeration, or even freezing, fluids may have a tendency to escape the food and accumulate in the starch which, as a result, also will inhibit the effectiveness of the coating, particularly upon heating for cooking and/or consumption.

Hence, it has been found that amounts of water in excess of about 55% by weight based upon the weight of the mixture should be avoided. On the other hand, water in an amount of less than about 40% by weight results in a mixture which has an undesirably high viscosity which, in general, will result in a coating which is difficult to apply and hence, be difficult to control from a process standpoint. Moreover, in general, it will be found that such a coating will be undesirably perceptible to the untrained eye. preferably, the mixture has a water content of from about 45% to about 50% by weight based on the total weight of the mixture.

As referred to above, an edible oil advantageously may be mixed with the mixture, since it has been found that an oil not only assists in effecting a homogeneous dispersion of the effective ingredients in the water, but also operates to provide coating elasticity to relieve stress and inhibit film cracking, hence, thereby assisting in inhibiting localized leakage. In addition, the oil generally will be found to enhance mouthfeel of the final product. Preferably, the oil is a vegetable oil and preferably is a poly-unsaturated oil to minimize the caloric content of the product. The oil may be employed in amounts of from about 3% to about 7%, preferably from about 4% to about 6%, by weight based upon the weight of the mixture.

Also as noted above, salt may be employed usefully, not as an organoleptic enhancer, but as fulfilling a function of assisting in maintaining mixture homogeneity over time by acting as a water binder in the mixture, and such will also act as a water binder in the food. Salt may be employed in amounts up to about 7% by weight, and preferably from about 4% to 6%, by weight based upon the weight of the mixture.

The mixture of starch, milk protein, egg albumen and water, with or without oil and/or salt, may be prepared simply by mixing the ingredients, with the caveat that temperatures which would tend to coagulate the albumen, denature the protein or gelatinize the starch should be avoided during mixing. Thus, in general, temperatures on the order of higher than about 50° C. should not be employed during mixing. Advantageously, to obtain homogeneity, the albumen, milk protein and starch in powder form first are dry mixed and then added to water and mixed by any of various means known to those of ordinary skill which provide reasonable homogeneity, including a simple blender or wisk means, for example.

How one coats the food is dependent upon the viscosity of the mixture and configuration of the food pieces. Although the coating may be applied by brushing, by spreading or by spraying the mixture onto the surface of the food, the coating is carried out most advantageously by immersing the food into the mixture, such as by dipping the food to be coated into the mixture. Tumbling food with the mixture is a further alternative.

As will be appreciated upon practice of the inventions as disclosed above, and particularly when applying the coating merely by immersing the food in and then removing it from the mixture, the mixture quite surprisingly has an inherent tendency to be coated on the food in an amount sufficient to provide the desired retention properties. Moreover, time of immersion is not a factor of significance in obtaining sufficient amounts of coating when the food is immersed, the key simply being that the food be brought into contact with the mixture so that its exterior becomes coated with a substantially continuous layer of the coating, note being made here, however, that the present invention does not exclude coating only a portion or portions of an exterior surface of a food.

Thus, the mixture of the present invention surprisingly presents the ability to achieve the desired results by employing, for example, continuous conveying means which provides for immersion of the food in the mixture. Hence, desired amounts of coating are obtained when food is conveyed through a bath of the mixture for a time sufficient for the coating to be applied to the exterior surface of the food. Such continuous coating operations may be carried out on a wire mesh or link conveyor device means which travels through a container holding the mixture. Desirably, the bath is agitated gently.

Moreover, since it has been found that, in general, the food pieces tend to float in the mixture, means, such as similar upper and lower parallel conveyor device means, are provided to convey and restrict the floating movement of the food pieces to be coated so that they are caused to immersed for a time sufficient to coat substantially the entirety of their outer, or exterior, surfaces. Thus, as will be appreciated, loosely "sandwiching" the food pieces between two conveyor element means, taken together with the tendency of the food pieces to float, easily enables coating substantially the entire external surface of the food pieces. Surprisingly, therefore, not only is an effective coating obtained, but minimal process control, other than mixture control within the confines of the inventions described above, is required.

Note also may be made that, in contrast to an immersion-type procedure, in which time of contact of the food with the mixture is not of particular significance, if one tumbles a food and the mixture, time to effect an adequate coating is of more significance. Depending upon amounts of food and mixture employed, one may wish to tumble for from about 3 mins to about 7 mins.

After removal from the bath, or from a tumbler, excess mixture preferably is allowed to drip off the coated food. Blowing air on the coated food also will be found to remove excess coating more quickly, and it will be found that by operating in accordance with the inventions as described above, either procedure will result in desirable coating amounts.

Although the mixture and the food may be at ambient temperature, e.g., from about 16° C. to about 25° C., for coating, the coating application process preferably is carried out at a refrigeration temperature, e.g., about 4° C. to about 8° C., and food may be frozen when coated, which is most advantageous for coating fish.

In general, the amount of mixture coated onto the meat may range from about 6% to about 12% by weight based on the weight of the food, and such amounts are particularly desirable for coated meats. Amounts desirably coated upon a food, however, are considered in the context of the nature of the food and its moisture content and the method of preparing the food for consumption. As will be found by practice of the present inventions, in general, coating amounts above about 13% by weight of the food to be coated become noticeable, and no significant concomitant increase in fluid retention may be realized with such amounts in any event.

After coating, although the coated food product may be packed as is, to realize the particular advantages of the present inventions, i.e., provision of an appealing convenience food which has retained a high content of its natural fluids, the coating is heated to at least a temperature sufficient to, at least partially, coagulate the albumen, denature the protein and modify the starch. Although complete denaturation and gelation are not required, it is preferred that substantially all of the albumen, milk protein and starch are coagulated, denatured and gelled, respectively. As will be appreciated, temperatures in excess of about 60° C., and preferably in excess about 70° C., will effect these results.

Preferably, in the case of a convenience food, the coated food product is heated to cook the food at least partially, which thereby coagulates the albumen, denatures the protein and gelatinized the starch. Grilling, searing, or stir-frying may be employed to accomplish this effectively and to provide an attractive grill mark or other pleasantly colored outer appearance. Preferably, if searing, stir-frying, or other frying is performed, minimal amounts of oil, such as an amount merely necessary to prevent sticking to a pan, are employed. It is made clear, however, that deep-fat frying cooking is not excluded and is a viable cooking method.

Alternatively, the coated food product may be heated in a steam cabinet or in an oven to cook it, and the food may be marked or browned first by one of the methods noted above and then cooked in any way desired. In any event, no matter what cooking processing method is chosen, fluid losses are substantially reduced from the losses which occur when cooking the food without the coating.

The sous vide process also advantageously is employed, particularly in the case of fish steaks or fillets, and it will be found that the packaged fluid purge may be reduced to substantially nil by reason of employing the present inventions. Hence, the food is placed in a pouch, made of suitable food-acceptable plastic materials as known in the art, which then is sealed under vacuum, e.g., 600–650 mm Hg. The sealed pouch and contents are heated, for instance in a water bath having a water temperature sufficient, e.g., from 60° C. to 75° C., for a time sufficient to make the product microbiologically stable preferably, the product is brought to an ICT of from about 63° C. to about 65° C. and held at such temperature for about 15 mins to 18 mins. Afterwards, the pouch is chilled, and then the pouch-packaged product may be frozen preferably, the coating first is heat-set, such as by searing, grilling, or stir-frying, to provide a pleasant cooked outer surface appearance and to coagulate the egg, denature the protein and gelatinize the starch, at least partially.

Additionally, it also has been discovered that in the case of retorted products which include sauces, problems arise, as indicated above, not so much from fluids entering a food, such as meat, contained in the sauce, but from fluids leaving the meat and diluting the sauces. By reason of fluids leaving the meat and/or by transfer of fluids between meat and a sauce, not only does the sauce lose its basic character and viscosity, but the meat becomes undesirably dry, fibrous and tough and will lose its distinct flavor. By practice of the present invention, however, the character of the meat is preserved not only by internally retaining its fluids, flavor and texture, but also, since fluid loss from the meat during the retorting and during storage is inhibited, the viscosity of the sauce is maintained.

Moreover, it has been found that employing the coating mixture compositions of the present inventions on lean meats, i.e., meats having fat contents generally on the order of from about 5% to about 15%, provides advantages not expected based upon experimentation with non-lean meats.

As will be appreciated by one of ordinary skill, lean meats, although preferred by health conscious consumers, generally are less preferred by the consumer because they lack the "richness" and mouthfeel of nonlean meats. Those characteristics are magnified when such meats are employed as or incorporated into convenience foods, wherein due to preparative cooking and refrigeration, the lean meat develops an additional dry, fibrous and tough texture. Thus, it has been discovered that the coating of the present inventions not only retains moisture but enhances the perception of richness and mouthfeel of lean meats to provide a more non-lean character.

Thus, as will be appreciated, upon practice of the present inventions, cooked food products, and meat products, in particular, may be obtained which contain substantial amounts of their natural fluids and which have a pleasant appearance and texture, as is further illustrated by the Examples below.

EXAMPLES

The following Examples, in which parts and percentages are by weight unless otherwise indicated, further illustrate the present inventions.

Example I

Whole boneless chicken breasts are trimmed to provide pieces of meat having a weight of about 75 g each.

One group of breasts is dipped into a mixture containing approximately:

| Ingredients | % |
| --- | --- |
| Egg white powder | 8.8 |
| MELOGEL ungelatinized corn starch | 40.6 |
| LACPRODANE 80 milk protein | 7.6 |
| Water | 43 |

The coated chicken breasts, after substantially all non-adhering coating has been allowed to drip off, are weighed. The coated breasts have a weight, on average, of about 82 g.

The coated chicken breasts are cooked by heating them in a steam cabinet until the breasts reach an internal core temperature of about of 74° C., as determined by a DiGi-SENSE thermocouple thermometer. After cooling to room temperature, the cooked coated breasts are weighed, and it is found that the breasts weigh, on average, about 79 g.

One group of breasts is not coated. These uncoated breasts are heated in a steam cabinet, as above, to cook them. The cooked weight, on average, is about 59 g.

The results of this experiment are shown further by Exhibit A submitted for filing with this Application. Photograph Aa shows an uncooked breast piece. Photograph Ab shows the breast Aa after coating and cooking. Photograph Ac shows a side-by-side width comparison of an uncoated, cooked breast (left) and the coated cooked breast. Photograph Ad shows a side-by-side thickness comparison of the uncoated cooked breast (left) and the coated cooked breast. As can be seen, the coated cooked breast is substantially more plump than the uncoated cooked breast.

Example II

Whole boneless chicken breasts are trimmed to provide a pieces of meat having a weight of about 75 g each.

One group of breasts is dipped into a mixture containing approximately:

| Ingredients | % |
| --- | --- |
| Egg white powder | 8.8 |
| MELOGEL ungelatinized corn starch | 40.6 |
| LACPRODANE 80 milk protein | 7.6 |
| Water | 39 |
| Corn oil | 4 |

Coated and uncoated chicken breasts are cooked as in Example I above. Substantially the same results are achieved as in Example I above.

Photographs of breasts treated as above also are provided in the accompanying Exhibit B. Photographs Ba and Bb show uncoated uncooked and cooked breasts, respectively. Photographs Bc and Bd show coated uncooked and cooked breasts, respectively. Photograph Be shows a side-by-side view of the cooked untreated (left) and cooked coated breasts. Again, the coated cooked breast is substantially more plump than the uncoated cooked breast.

Example III

Pieces of chicken breast meat (approx. 4 cm×2 cm×1 cm) are prepared.

350 g of the pieces are coated with 25 g of a mixture containing, by weight, based upon the weight of the mixture, 7.75% egg white powder, 6.65% whey concentrate (LACPRODANE 80), 35.6% ungelatinized corn starch (MELOGEL), corn oil and 45% water.

The coated pieces are stir-fried in a pan containing about 10 g of corn oil to avoid sticking of the pieces to the pan. The pieces are stir-fried until the pieces reach an internal core temperature of about 77° C., as determined by DiGi-SENSE thermocouple thermometer. About 356 g of product are obtained, which provides a cooked yield of about 95% (based upon the weight of the coated pieces prior to stir-frying).

350 g of the chicken pieces are not treated with the coating as above, but are stir-fried in the same amount of cooking oil to substantially the same internal core temperature. About 273 g of fried pieces are obtained, which provides a cooked yield of about 78% (based upon the weight of the pieces prior to stir-frying).

Example IV

A mixture containing the following ingredients is prepared:

| Ingredients | % |
| --- | --- |
| Egg white powder | 7.75 |
| LACPRODANE 80 milk protein | 6.65 |
| MELOGEL ungelatinized starch | 30.6 |
| National 711 gelatinized starch | 5.0 |
| Corn oil | 5.0 |
| Water | 45.0 |

This mixture is quite viscous, and it is not particularly desirable to employ such as a coating.

A second mixture containing the following ingredients is prepared:

| Ingredients | % |
| --- | --- |
| Egg white powder | 7.045 |
| LACPRODANE 80 milk protein | 6.045 |
| MELOGEL ungelatinized starch | 27.820 |
| National 711 gelatinized starch | 4.545 |
| Corn oil | 4.545 |
| Water | 50.000 |

The second mixture has a fluid consistency which is acceptable for coating the exterior of pieces of food. Upon coating chicken pieces prepared for EXAMPLE III, it is found that fluid retention substantially equivalent to the results of Example III is obtained.

Example V

Swordfish steaks having a thickness of about 2 cm and weighing about 160 g are dipped into the following mixture:

| Ingredients | % |
| --- | --- |
| Egg white powder | 8.00 |
| ungelatinized corn starch | 40.00 |
| Milk protein | 7.00 |
| Salt | 5.00 |
| Caramel color | 0.30 |
| Water | 39.70 |

The steaks are grilled for about 1 min on each side on a preheated EMBERGLOW grill set on a high temperature setting for marking the steaks. That procedure coagulates egg, denatures milk protein and gells starch. The treated steaks are found to have substantially no weight loss.

The grilled steaks are placed in plastic pouches which are sealed under vacuum. The sealed pouches and contents are immersed in a water bath having a temperature of about 63° C. When the steaks reach an ICT of 60° C., they are kept in the bath for a further 15 minutes. The pouches and contents then are removed from the bath, chilled and refrigerated at a temperature of about 4° C.

After two days of refrigeration, the pouches are opened to determine the amount of fluid loss from the steaks. It is found that the amount of fluid in the pouches ranges from none to 5 g.

The coated steaks removed from the pouches are heated for consumption in a microwave oven. Substantially no fluids are exuded onto the supporting surface during heating, and the steaks are found to have a flaky moist texture.

For comparison, swordfish steaks having a thickness of about 2 cm and weighing about 160 g are not treated with the coating as above but are grilled as above. After grilling, these steaks are found to have about a 5% weight loss. These steaks then are placed in a pouch and treated as above.

After refrigeration, all pouches contained substantial amounts of fluids. The pouches are opened and the fluids are collected. It is found that the pouches contain fluids in amounts of from about 15 g to 20 g.

The uncoated steaks then are heated in a microwave oven for consumption. Further fluids which have escaped the steaks are present on the supporting surface after microwave heating. The steaks are tasted and are found to be unpleasantly dry and fibrous.

Example VI

Pork butt is trimmed of surface fat and is cut into cubes of about 12 mm thickness.

1400 g of the cubes are seared in a skillet with 30 g of corn oil to prevent sticking of the meat to the pan. 965 g of fried pork cubes, are obtained.

1400 g of the cubes are coated with 120 g of a mixture of about 6.75% powdered egg white, about 34.6% corn starch, about 6.65% whey protein concentrate, about 47% water and about 5% corn oil. The coated cubes are sear fried in the same amount of oil as above and 1400 g of fried, coated pork cubes are obtained.

Each of the two portions of the fried cubes are added separately to a blend of ingredients, which comprises a sweet and sour sauce, blanched vegetable pieces and pineapple chunks, in a container which then is closed and retorted at a temperature of about 121° C. about 1 hr.

After storage at room temperature for 2 days, the products are heated for consumption and evaluated. The uncoated cubes are distinctly more fibrous in texture and less moist than the coated cubes and lack the consistency of the coated cubes. In addition, the sauce containing the uncoated cubes has thinned and is less viscous then the sauce containing the coated cubes.

Example VII

Codfish is cut into cubes of about 15 mm. One portion is stir-fried in an amount of cooking oil sufficient to prevent sticking and provides a yield of about 75% by weight. One portion is coated with a coating mixture having the composition of the mixture in EXAMPLE VI above and provides a yield of about 97% based upon the starting weight of the coated cubes.

Each of the stir-fried portions are packed with a lemon herb sauce and retorted as in EXAMPLE VI above.

Upon evaluation after reheating for consumption, the untreated fish cubes are, in comparison with the coated cubes, dry and fibrous. In addition, the sauce containing the untreated cubes is thinned out from moisture released from the cubes, whereas the sauce containing the treated cubes substantially retains its original viscosity.

Example VIII

A mixture of egg white powder, whey protein powder and corn starch in amounts of about 15.5%, 13.3% and 71.2%, respectively, by weight based upon the total weight of the mixture, is prepared. The mixture is mixed with water and corn oil in the percentages by weight as indicated below:

| COATING | A | B | C |
| --- | --- | --- | --- |
| MIX | 46.15 | 37.5 | 31.6 |
| WATER | 46.15 | 56.25 | 63.15 |
| OIL | 7.7 | 6.25 | 5.25 |

Blocks of frozen cod fish are coated by dipping separate blocks into separate mixtures. The coated blocks are held to allow fluid material to drip off the blocks and until drip of the coating material from the blocks has substantially ceased.

Weight comparison of the coated blocks indicates that blocks coated with COATING A retain about 6.8% coating by weight based upon the weight of the fish block. Blocks coated with COATING B retain about 4.2% coating by weight, and blocks coated with COATING C retain about 4% coating by weight.

Samples of each of coated blocks A, B and C are placed in sealed plastic pouches and frozen. After 2 days, the pouches containing the frozen cod are placed in boiling water to cook the fish.

After cooking, the pouches are compared visually. No fluid or drip is evident in the pouches containing coated blocks A. Visible drip is apparent in each of the pouches containing coated blocks B and C.

Samples of each of the cooked coated blocks A, B and C are placed in a lemon sauce in a container. After storage for 2 days, the products are evaluated. In comparison with the products containing cooked coated blocks A, sauces of the products containing cooked coated blocks B have thinned perceptibly, and the products containing cooked coated blocks C have thinned significantly. Sedimentation resultant from thinning of the sauce was C>B>A.

Example IX

Samples of coated blocks I of EXAMPLE VIII above, are cooked in a microwave oven. Only a slight amount of drip results, and the cooked fish has a light fluffy texture. The coating is not perceptible to the eye. In comparison, frozen blocks which are not treated in accordance with the present invention are cooked in the microwave oven under the same conditions. Significantly more amounts of fluid escape the fish during cooking, and the cooked fish has a dry and fibrous texture.

As is clear from the foregoing, various modifications of the present invention may be without departure from the spirit and scope of the disclosure, and the invention may be practiced suitably in the absence of elements not specifically disclosed herein.

We claim:

1. A process for treating meat and preparing a food product comprising:

preparing an ingredient mixture consisting essentially of egg albumen, milk protein, an ungelatinized starch and water and at least one ingredient selected from the group consisting of a gelatinized starch, an edible oil and salt wherein, by weight, the egg albumen is in an amount of at least about 5%, the milk protein is in an amount of at least about 5%, the ungelatinized starch is in an amount of at least about 25%, the water is in an amount of at least about 40% and the gelatinized starch is in an amount not more than about 6%, each weight being based upon the weight of the mixture;

coating the mixture on an exterior surface of a raw whole meat piece to obtain a coated meat;

heating the coated meat at least to a temperature sufficient and for a time sufficient to coagulate the albumen, denature the milk protein and gelatinize the ungelatinized starch to obtain a heat-treated coated food product; and vacuum-packing the heat-treated coated food product to obtain a packed food product and heating the packed product at a temperature for a time sufficient for microbiologically stabilizing the packed product.

2. A process for treating meat and preparing a food product comprising:

preparing an ingredient mixture consisting essentially of egg albumen, milk protein, an ungelatinized starch and water wherein, by weight, the egg albumen is in an amount of at least about 5% the milk protein is in an amount of at least about 5% the ungelatinized starch is in an amount of at least about 25% and the water is in an amount of at least about 40%, each weight being based upon the weight of the mixture;

coating the mixture on an exterior surface of a raw whole meat piece to obtain a coated meat;

heating the coated meat at least to a temperature sufficient and for a time sufficient to coagulate the albumen, denature the milk protein and qelatinize the ungelatinized starch to obtain a heat-treated coated food product; and vacuum-packing the heat-treAted coated food product to obtain a packed food product and heating the packed product at a temperature for a time sufficient for microbiologically stabilizing the packed product.

3. A process according to claim 1 wherein the ingredient mixture prepared consists essentially of the egg albumen, milk protein, ungelatinized starch and water and at least one of the oil and salt ingredients.

4. A process according to claim 1 wherein the ingredient mixture consists essentially of the egg albumen, milk protein, ungelatinized starch and gelatinized starch.

5. A process according to claim 1 or 2 or 3 or 4 wherein the ungelatinized starch is in an amount of at least about 30% by weight.

6. A process according to claim 1 wherein the ingredient mixture includes the edible oil, salt and gelatinized starch and the edible oil is in an amount up to about 7% by weight, the salt is in an amount up to about 7% by weight and the gelatinized starch is in an amount up to about 3% by weight.

7. A process according to claim 2 or 3 wherein, by weight, the egg albumen is in an amount of from about 6% to about 12% the milk protein is in an amount of from about 6% to about 19%, and the ungelatinized starch is in an amount of from about 30% to about 55% and the water is in an amount of from about 45% to about 50%.

8. A process according to claim 1 or 3 wherein, when present in the ingredient mixture, the oil is in an amount up to about 7% by weight and the salt is in an amount up to about 7% by weight.

9. A process according to claim 4 wherein the gelatinized starch is in an amount up to about 3% by weight.

10. A process according to claim 2 or 3 wherein the meat is fish.

11. A process according to claim 2 or 3 wherein the coated meat is heated sufficiently to brown an outer surface of the meat.

12. A process according to claim 11 wherein the meat is fish and the coated fish is grilled to impart grill marks.

13. A process according to claim 2 or 3 further comprising packing a sauce with the heat-treated coated meat.

14. A process according to claim 2 or 3 wherein the packed product is heated at a temperature of from about 60° C. to 75° C.

15. The product of the process of claim 2.

16. The product of the process of claim 10.

* * * * *

UNITED STATES PATENT AND TRADEMARK OFFICE
CERTIFICATE OF CORRECTION

PATENT NO. : 5,567,453
DATED     : October 22, 1996
INVENTOR(S) : Ernesto J. REUTIMANN, et al.

It is certified that error appears in the above-identified patent and that said Letters Patent is hereby corrected as shown below:

Column 2, line 9, after "include", insert --a--.

Column 9, line 12, change "gelatinized" to --ungelatiized--.

Column 11, line 38, change "gelatinized" to --gelatinizes--.

Column 17, in each of lines 19 and 20 (lines 6 and 7 of claim 2), insert a comma after "5%".

Column 17, line 32, (line 18 of claim 2), change "treAted" to --treated--.

Column 18, line 14 (line 3 of claim 7), insert a comma after "12%".

Signed and Sealed this

Twenty-eighth Day of January, 1997

Attest:

BRUCE LEHMAN

Attesting Officer    Commissioner of Patents and Trademarks